Figure 5:
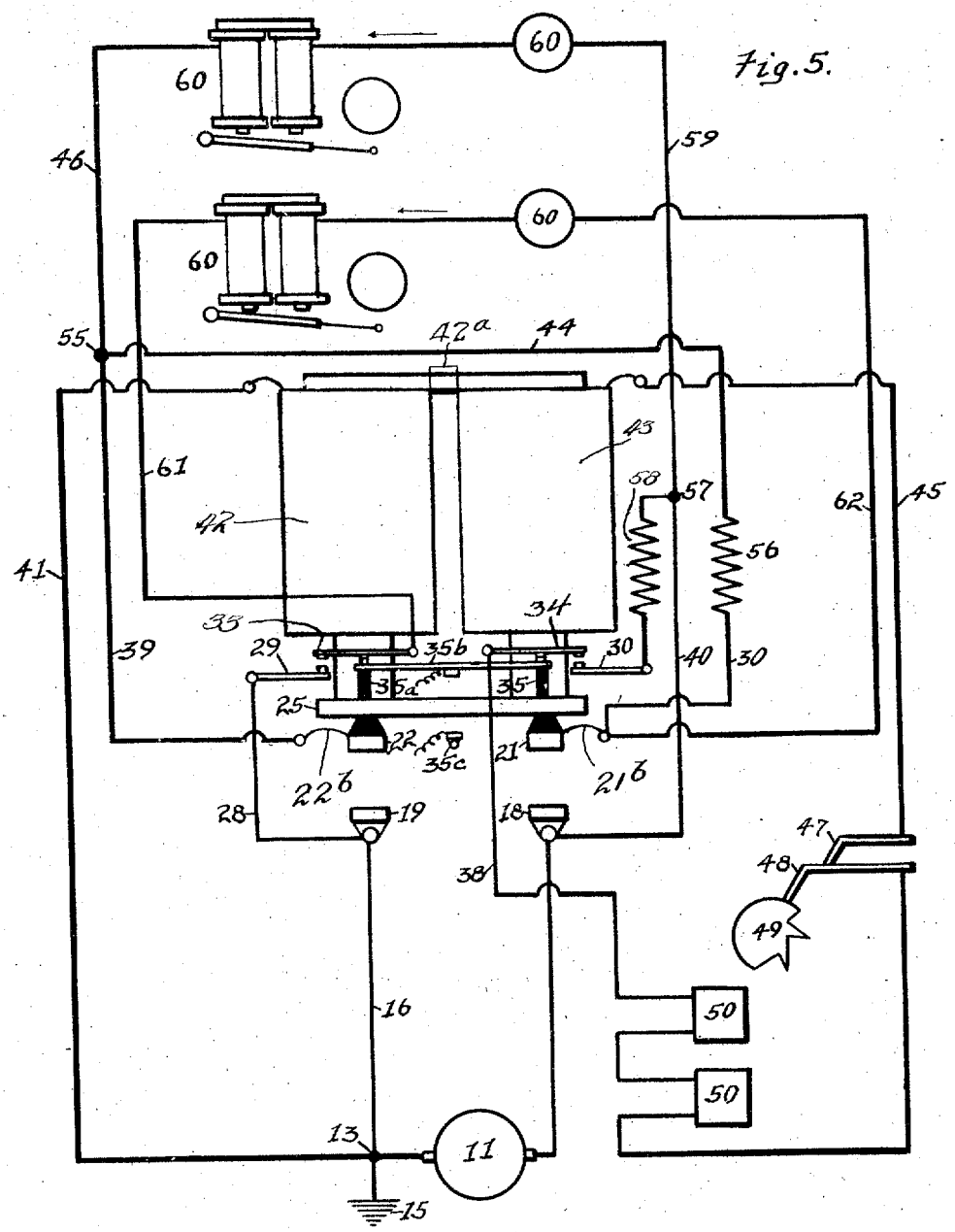

S. B. HESS.
Reissued Dec. 14, 1920. FIRE ALARM SYSTEM. 15,005.
APPLICATION FILED OCT. 21, 1920.
5 SHEETS—SHEET 1.
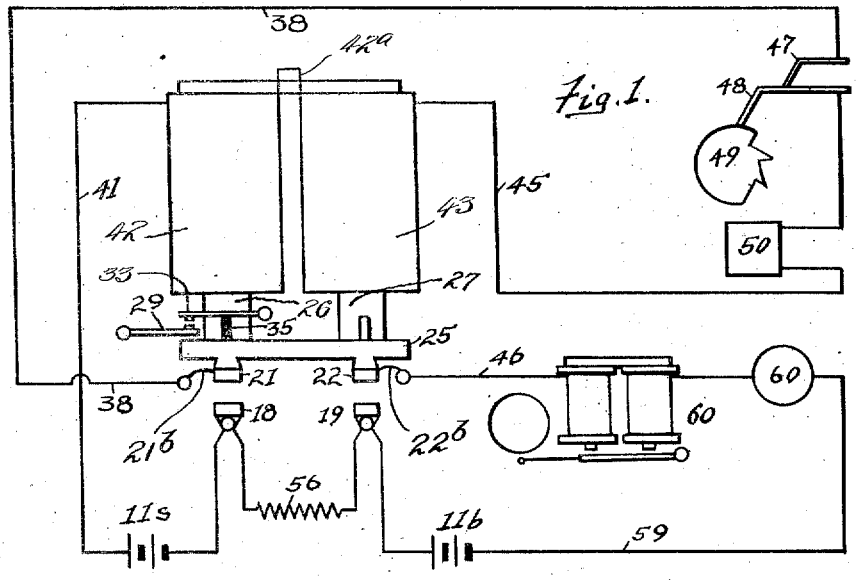
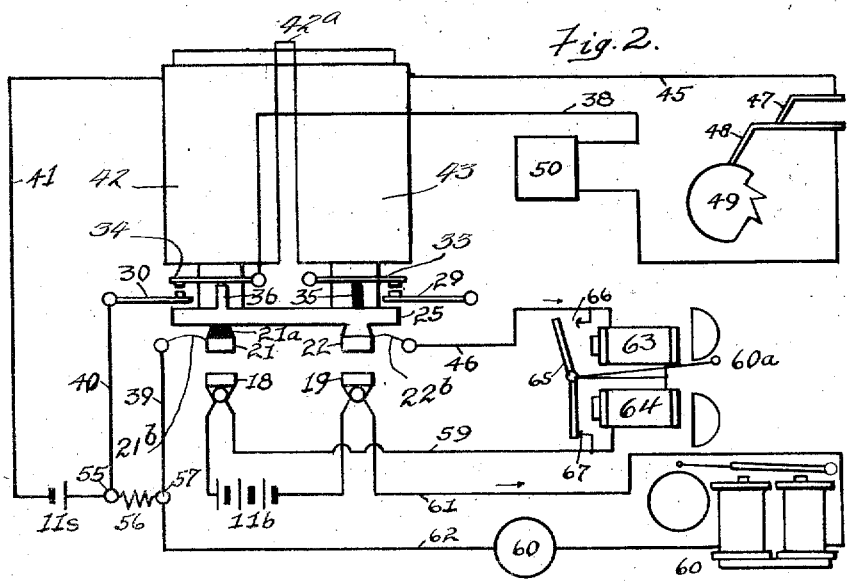
INVENTOR.
Simon B. Hess S. B. HESS.
FIRE ALARM SYSTEM.
Reissued Dec. 14, 1920. 15,005.
APPLICATION FILED OCT. 21, 1920.
5 SHEETS—SHEET 2.
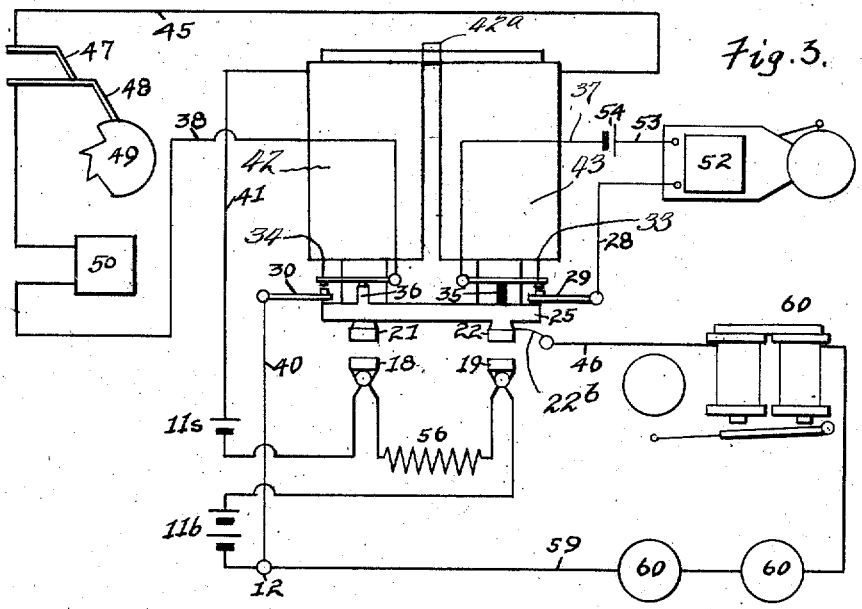
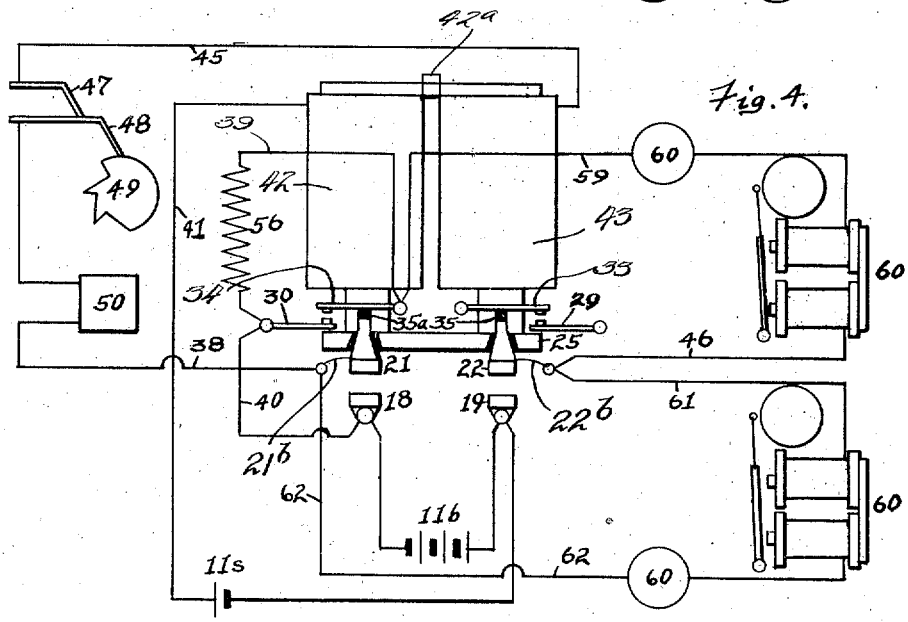
INVENTOR.
Simon B. Hess

S. B. HESS.

FIRE ALARM SYSTEM.

Reissued Dec. 14, 1920. 15,005.

APPLICATION FILED OCT. 21, 1920.

5 SHEETS—SHEET 3.

INVENTOR.

Simon B. Hess

S. B. HESS.

FIRE ALARM SYSTEM.

Reissued Dec. 14, 1920

APPLICATION FILED OCT. 21, 1920.

15,005.

5 SHEETS—SHEET 4.

INVENTOR.

Simon B. Hess

S. B. HESS.

FIRE ALARM SYSTEM.

Reissued Dec. 14, 1920. 15,005.

APPLICATION FILED OCT. 21, 1920

5 SHEETS—SHEET 5.

INVENTOR.

Simon B. Hess

UNITED STATES PATENT OFFICE.

SIMON B. HESS, OF JAMAICA, NEW YORK.

FIRE-ALARM SYSTEM.

15,005. Specification of Reissued Letters Patent. Reissued Dec. 14, 1920.

Original No. 1,351,514, dated August 31, 1920, Serial No. 164,152, filed April 24, 1917. Application for reissue filed October 21, 1920. Serial No. 418,606.

*To all whom it may concern:*

Be it known that I, SIMON B. HESS, a citizen of the United States, residing at Jamaica, in the county of Queens and State of New York, have invented certain new and useful Improvements in Fire-Alarm Systems, of which the following is a specification.

The system disclosed by this invention is particularly adapted for utilization as an alarm system for protecting, say, from fire, localized territory, factory buildings and the like.

Systems of this class are designed primarily to provide means for sounding an alarm or a plurality of alarms upon the occurrence of a predetermined circumstance; for example, an alarm or a plurality of alarms, of fire, sent from any one of a plurality of stations and giving warning signals at one desired point or at a plurality of desired points in a building or the like, so as to warn the occupants of the existence of a fire to the end that they may make escape, or for the purpose of training the occupants of the building as to the most expeditious means of making their exit in case of fire or other catastrophe, or for the purpose of calling a fire brigade to quarters, &c.

In locations where suitable direct current electric service is available, energy for the operation of the alarm system may be obtained therefrom.

In locations where the electric service furnishes alternating current the system may be supervised with direct current and the signaling receiving devices operated with alternating current.

It is an object of this invention to provide an improved system wherein two bell loops may be supervised in series and operated in multiple.

It is another object to provide such a system wherein two or more loops may be supervised in series and operated in multiple without reversing the direction of current flow in any loop.

It is another object to provide a supervised trouble signal circuit.

It is another object of this invention to provide distinctive trouble signals arranged to be received on a single receiving device to indicate specific faults as they occur.

It is another object to provide a system that may be supervised with an extremely low value of current, and hence may be economically operated with battery current.

It is another object to provide a system wherein the different bell loops may be supervised from one source of energy and operated from another source of energy.

Objects and aims of this invention more or less broad than those stated above, together with its inherent advantages, will be in part obvious and in part specifically referred to in the course of the following description of the elements, combinations of means, arrangements of parts, and applications of principles constituting this invention, and the scope of protection contemplated will appear from the claims. I attain these objects and aims in the present embodiment by means of the circuits, devices, apparatus, resistances and sources of current supply illustrated in the accompanying drawings, which are to be taken as a part of these specifications, and constitute a diagrammatic disclosure of the said embodiment.

Figure 6:
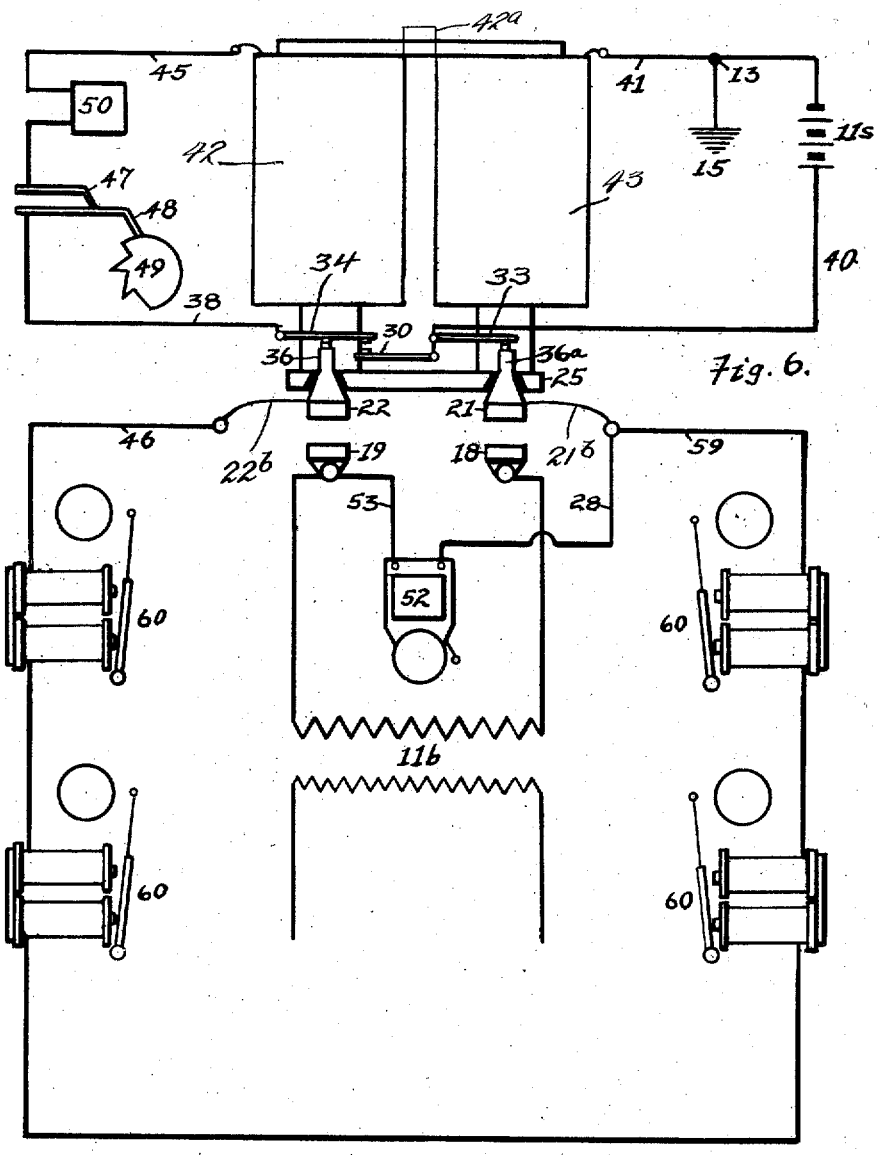
Figure 7:
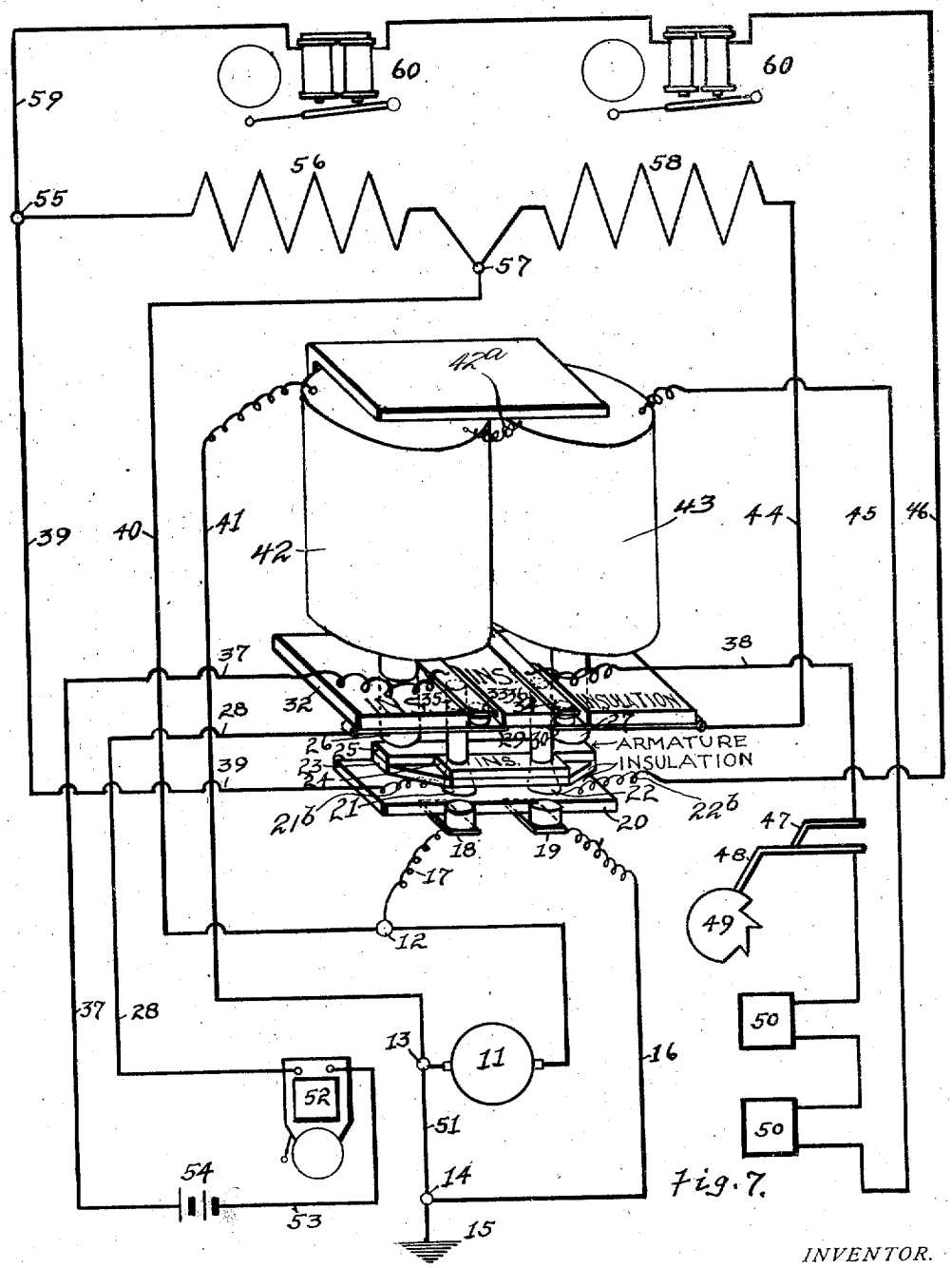

In the accompanying drawings, Figures 1 and 3 show applications of this invention to a system having one bell loop only; Figs. 2, 4 and 5 show applications of this invention to a system having two bell loops; Fig. 6 shows an application of this invention to a system in which energy for the operation of the alarm is obtained from one source, and energy for the supervision of the system is obtained from another source; and Fig. 7 shows a system adapted for use in connection with the three position relay claimed in my divisional application filed Dec. 22, 1917, Serial No. 208,426.

Referring to Fig. 1, $11^b$ and $11^s$ represent two sources of energy, one terminal of source $11^b$ being connected to contact stud 19, the opposite terminal of source $11^s$ being connected to contact stud 18. Resistance 56 is connected between contact studs 18 and 19. Electromagnet coils 42 and 43 are provided with cores 26 and 27 respectively, adjacent to which armature 25 is mounted. Armature 25 has attached thereto the contact pieces 21 and 22, adapted to make contact with contact studs 18 and 19 respectively. Armature 25 also carries the insulating piece 35 which is adapted to engage contact spring 33 and hold it away from contact spring 29. When armature 25 is in its retracted position contact pieces 21 and 22 are adapted to engage with contact studs 18 and 19, contact springs 29 and 33 being in engagement with each other. When armature 25 is in its attracted position, insulating piece 35 holds contact spring 33 away from contact spring 29. A trouble bell and battery may be connected to contact springs 29 and 33, as shown in Fig. 3 and Fig. 7. A signaling station is diagrammatically represented by the breakwheel 49 arranged to operate the signaling levers 47, 48. Another similar station is indicated by the rectangle 50. 60 represents a single stroke bell.

Under normal conditions electromagnet coils 42 and 43 are energized to hold armature 25 in its attracted position, the following closed circuit being established:—from right hand terminal of source $11^b$ to conductor 59 of the bell loop, the bells 60 in series, conductor 46 of the bell loop, flexible connection $22^b$, contact piece 22, armature 25, contact piece 21, flexible connection $21^b$, conductor 38 of the station loop, signaling levers 47 and 48, station 50, conductor 45 of the station loop, electromagnet coil 43, conductor $42^a$, electromagnet coil 42, conductor 41, to left hand terminal of source $11^s$, through source $11^s$ to contact stud 18, resistance 56, contact stud 19, to left hand terminal of source $11^b$. The winding of coils 42 and 43 is so related to that of the magnets of the bells 60 that the current passing through the circuit just described is sufficient to cause armature 25 to be moved to its attracted position, while the bell magnets are unable even to retain their armatures in attracted position. While coils 42 and 43 are themselves of comparatively high resistance, resistance 56 in series therewith assists in securing a minimum value for the normal current flow after armature 25 has been moved to attracted position.

Upon the pulling of any station and the movement of its breakwheel 49 to operate its signaling levers 47 and 48 and the consequent breaking of the normal closed circuit, armature 25 will be retracted, establishing the following two circuits; (1) from right hand terminal of source $11^b$ to conductor 59 of the bell loop, the bells 60 in series, conductor 46 of the bell loop, flexible connection $22^b$, contact piece 22, contact stud 19, to left hand terminal of source $11^b$; (2) from right hand terminal of source $11^s$ to contact stud 18, contact piece 21, flexible connection $21^b$, conductor 38 of the station loop, to signaling lever 47 of the operated station, to signaling lever 48 thereat (now open here), conductor 45 of the station loop, electromagnet coil 43, conductor $42^a$, electromagnet coil 42, conductor 41, to left hand terminal of source $11^s$.

It will be seen that in circuit (1) the bell loop is now connected to the terminals of the source of energy $11^b$ with no intervening resistance except that of the line conductors. The bell magnets are so constructed and arranged and the number of cells in source $11^b$ is so taken that the bell magnet armatures are now effectively attracted to sound a stroke of the signal. When circuit (2) is closed by signaling levers 47 and 48, source $11^s$ acts upon electromagnet coils 42 and 43, and armature 25 is attracted and reëstablishes the normal closed circuit. Upon further movement of breakwheel 49 this operation will be repeated, every interruption of the circuit at the signaling levers 47 and 48 causing the sounding of a stroke of the alarm upon the bells 60. The trouble bell will, of course, be operated upon the closure of contact springs 29 and 33. It will also be seen that resistance 56 is shortcircuited through contact stud 18, contact piece 21, armature 25, contact piece 22, to contact stud 19.

In case of a break in the station loop, armature 25 will be retracted, causing a single stroke upon the bells 60. In the case of a break in the bell loop, the armature 25 will move to its retracted position, but the closing of circuit (2) from contact stud 18 to contact piece 21 will cause armature 25 to be moved toward its attracted position, and a vibrating action will be set up.

Referring next to Fig. 3, $11^b$ and $11^s$ represent two sources of energy, connected to contact studs 18 and 19 and resistance 56, electromagnet coil 42, and conductor 59 of the bell loop as in Fig. 1. In addition to contact pieces 21 and 22 and insulating piece 35, armature 25 has attached thereto the contact end 36 which is adapted to engage and make contact with contact spring 34 and hold it away from contact spring 30. When armature 25 is in its retracted position contact spring 30 is adapted to engage and make contact with contact spring 34 and hold it away from contact end 36. A trouble bell 52 is arranged to be operated by trouble battery 54 when contact spring 33 touches contact spring 29.

Under normal conditions electromagnet coils 42 and 43 are energized to hold armature 25 in its attracted position, the following closed circuit being established:—from lower terminal of source $11^b$ to junction 12, conductor 59 of the bell loop, the bells 60 in series, conductor 46 of the bell loop, flexible connection $22^b$, contact piece 22, armature 25, contact end 36, contact spring 34, conductor 38 of the station loop, station 50, signaling levers 48 and 47, conductor 45 of the station loop, electromagnet coil 43, conductor $42^a$, electromagnet coil 42, conductor 41, to upper terminal of source $11^s$, through source $11^s$ to contact stud 18, resistance 56, contact stud 19, to upper terminal of source $11^b$. The winding of coils 42 and 43 is so related to that of the magnets of the bells 60 that the current passing through the circuit just described is sufficient to cause armature 25 to be moved to its attracted position, while the bell magnets are unable even to retain their armatures in attracted position. While coils 42 and 43 are themselves of comparatively high resistance, resistance 56 in series therewith assists in securing a minimum value for the normal current flow after armature 25 has been moved to attracted position.

Upon the pulling of any station and the movement of its breakwheel 49 to operate its signaling levers 47 and 48, and the consequent breaking of the normal closed circuit, armature 25 will be retracted, establishing the following three circuits; (1) from junction 12 along conductor 59 of the bell loop, the bells 60 in series, conductor 46 of the bell loop, flexible connection $22^b$, contact piece 22, contact stud 19, to upper terminal of source $11^b$; (2) from junction 12, along conductor 40, contact spring 30, contact spring 34, conductor 38 of the station loop, to signaling lever 48 of the operated station, to signaling lever 47 thereat (now open here), conductor 45 of the station loop, electromagnet coil 43, conductor $42^a$, electromagnet coil 42, conductor 41, to upper terminal of source $11^s$, through source $11^s$ to contact stud 18, contact piece 21, armature 25, contact piece 22 (thus shortcircuiting resistance 56), to circuit (1), and thence to upper terminal of source $11^b$; (3) from right hand terminal of trouble battery 54, through conductor 53, trouble bell 52, conductor 28, contact spring 29, contact spring 33, conductor 37, to left hand terminal of battery 54.

It will be seen that in circuit (1) the bell loop is now connected to the terminals of the source of energy $11^b$ with no intervening resistance except that of the line conductors. The bell magnets are so constructed and arranged and the number of cells in source $11^b$ is so taken that the bell magnet armatures are now effectively attracted to sound a stroke of the signal. The closing of circuit (3) causes the ringing of the trouble bell, which continues as long as the armature 25 remains retracted. When circuit (2) is closed by signaling levers 47 and 48, the total voltage of sources $11^s$ and $11^b$ acting in series is available to cause electromagnet coils 42 and 43 to attract armature 25 and reëstablish the normal closed circuit.

In case of trouble, the system illustrated in Fig. 3 will operate similarly to the system illustrated in Fig. 1.

Referring now to Fig. 2, $11^b$ and $11^s$ represent two sources of energy, one terminal of source $11^b$ being connected to contact stud 19 and the other terminal being connected to contact stud 18. Source $11^s$ is so connected in series between resistance 56 and conductor 41 that its voltage is normally added to that of source $11^b$. Contact piece 21 is mounted upon the armature 25, being insulated therefrom by the insulating piece $21^a$. The ends of one bell loop are represented by conductors 46 and 59, while the ends of another bell loop are represented by conductors 61 and 62. The bell $60^a$ is of the "shunting" type and is diagrammatically represented as comprising the bell coils 63 and 64, the pivoted bent armature 65, and the contacts 66 and 67. When no current, or the small test current is flowing, armature 65 is biased to one side, as shown.

Under normal conditions electromagnet coils 42 and 43 are energized to hold armature 25 in its attracted position, the following closed circuit being established;—from right hand terminal of source $11^b$ to contact stud 19, conductor 61 of the first bell loop, the bells 60 in series, conductor 62 of the first bell loop, junction 57, resistance 56, junction 55, to right hand terminal of source $11^s$ through source $11^s$ to conductor 41, electromagnet coil 42, conductor $42^a$, electromagnet coil 43, conductor 45 of the station loop, signaling levers 47 and 48, station 50, conductor 38 of the station loop, contact spring 34, contact end 36, armature 25, contact piece 22, flexible connection $22^b$, conductor 46 of the second bell loop, bell coil 63, armature 65, contact 67, conductor 59 of the second bell loop, contact stud 18, to left hand terminal of source $11^b$. The winding of coils 42 and 43 is so related to that of the magnets of the bells 60 and $60^a$ that the current passing through the circuit just described is sufficient to cause armature 25 to be moved to its attracted position, while the bell magnets are unable even to retain their armatures in attracted position. While coils 42 and 43 are themselves of comparatively high resistance, resistance 56 in series therewith assists in securing a minimum value for the normal current flow after armature 25 has been moved to attracted position.

Upon the pulling of any station and the movement of its breakwheel 49 to operate its signaling levers 47 and 48 and the consequent breaking of the normal closed circuit, armature 25 will be retracted, establishing the following three circuits; (1) from contact stud 19, to conductor 61 of the first bell loop, the bells 60 in series, conductor 62 of the first bell loop, junction 57, conductor 39, flexible connection $21^b$, contact piece 21, to contact stud 18; (2) from contact stud 19, to contact piece 22, flexible connection $22^b$, conductor 46 of the second bell loop, bell coil 63, armature 65, contact 67, conductor 59 of the second bell loop, to contact stud 18; (3) from left hand terminal of source $11^s$, to conductor 41, electromagnet coil 42, conductor $42^a$, electromagnet coil 43, conductor 45 of the station loop, to signaling lever 47 of the operated station, to signaling lever 48 thereat (now open here), conductor 38 of the station loop, contact spring 34, contact spring 30, conductor 40, junction 55 to right hand terminal of source $11^s$.

It will be seen that in circuits (1) and (2) the bell loops are each now connected to the terminal of the source of energy $11^b$ with no intervening resistance except that of the line conductors. The bell magnets are so constructed and arranged and the number of cells in source $11^b$ is so taken that the armatures of the bells 60 are now effectively attracted to sound a stroke of the signal. The coil 63 of bell $60^a$ moves armature 65, removing the short from coil 64 and short circuiting coil 63, a vibrating action being set up and causing a continuous ring as long as circuit (2) is closed. When circuit (3) is closed by signaling levers 47 and 48, source $11^s$ acts upon electromagnet coils 42 and 43 and armature 25 is attracted and reëstablishes the normal closed circuit. Upon further movement of breakwheel 49 this operation will be repeated, every interruption of the circuit at the signaling levers 47 and 48 causing the sounding of a stroke of the alarm upon the bells 60 and a ring upon the bell $60^a$.

The usual trouble bell and battery may be connected to contact springs 29 and 33, or bell $60^a$ may be used as a trouble bell. In this event, it will be seen that the trouble bell is included in the normal closed circuit and hence is kept continually under test.

In case of a break in the station loop, armature 25 will be retracted, causing a single stroke upon the bells 60 and continuous ringing of the bell $60^a$. In case of a break in the first bell loop, the armature 25 will move to its retracted position, but the closing of circuit (3) from contact spring 34 to contact spring 30 will cause armature 25 to be moved toward its attracted position, thus causing an interrupted ringing of bell $60^a$. In case of a break in the second bell loop, the same vibrating action will cause a succession of strokes upon the bells 60. Upon observing the details of the two bell loop circuits (1) and (2), it will be noted that circuit (1) is closed from contact piece 21 to contact stud 18, while circuit (2) is closed from contact stud 19 to contact piece 22, hence the absence of the spark between either 18 and 21, or 19 and 22, will indicate which of the bell loops (1) or (2) is broken, in case of the occurrence of this vibrating action.

Referring next to Fig. 4, $11^b$ and $11^s$ represent two sources of energy, one terminal of source $11^b$ being connected to contact stud 19 and the other terminal being connected to contact stud 18. Source $11^s$ is so connected in series between contact stud 19 and conductor 41 that its voltage is normally added to that of source $11^b$. Contact pieces 21 and 22 are both insulated from armature 25, as shown. Insulating pieces 35 and $35^a$ are adapted to hold contact springs 33 and 34 away from their coöperating contact springs 29 and 30 when armature 25 is in its attracted position.

Under normal conditions electromagnet coils 42 and 43 are energized to hold armature 25 in its attracted position, the following closed circuit being established:—from right hand terminal of source $11^b$ to contact stud 19, to right hand terminal of source $11^s$, through source $11^s$, conductor 41, electromagnet coil 42, conductor $42^a$, electromagnet coil 43, conductor 45 of the station loop, signaling levers 47 and 48, station 50, conductor 38 of the station loop, conductor 62 of the first bell loop, the bells 60 in series therein, conductor 61 of the first bell loop, conductor 46 of the second bell loop, the bells 60 in series therein, conductor 59 of the second bell loop, conductor 39, resistance 56, conductor 40, contact stud 18, to left hand terminal of source $11^b$. The winding of coils 42 and 43 is so related to that of the magnets of the bells 60 that the current passing through the circuit just described is sufficient to cause armature 25 to be moved to its attracted position, while the bell magnets are unable even to retain their armatures in attracted position. While coils 42 and 43 are themselves of comparatively high resistance, resistance 56, in series therewith assists in securing a minimum value for the normal current flow after armature 25 has been moved to attracted position.

Upon the pulling of any station and the movement of its breakwheel 49 to operate its signaling levers 47 and 48 and the consequent breaking of the normal closed circuit, armature 25 will be retracted, establishing the following three circuits: (1) from contact stud 19, to contact piece 22, flexible connection $22^b$, conductor 61 of the first bell loop, the bells 60 in series therein, conductor 62 of the first bell loop, flexible connection $21^b$, contact piece 21, to contact stud 18; (2) from contact stud 19, to contact piece 22, flexible connection $22^b$, conductor 46 of the second bell loop, the bells 60 in series therein, conductor 59 of the second bell loop, contact spring 34, contact spring 30, conductor 40, to contact stud 18; (3) from contact stud 19, through source $11^s$, conductor 41, electromagnet coil 42, conductor $42^a$, electromagnet coil 43, conductor 45 of the station loop, to signaling lever 47 of the operated station, to signaling lever 48 thereat (now open here), conductor 38 of the station loop, flexible connection $21^b$, contact piece 21, to contact stud 18.

It will be seen that in circuits (1) and (2) the bell loops are each now connected to the terminals of the source of energy $11^b$ with no intervening resistance except that of the line conductors. The bell magnets are so constructed and arranged and the number of cells in source $11^b$ is so taken that the armatures of the bells 60 are now effectively attracted to sound a stroke of the signal. When circuit (3) is closed by signaling levers 47 and 48, the total voltage of sources $11^s$ and $11^b$ acting in series is available to cause electromagnet coils 42 and 43 to attract armature 25 and reëstablish the normal closed circuit. It will also be seen that resistance 56 is shortcircuited through contact spring 30, contact spring 34, and conductor 39. The usual trouble bell may be connected to contact springs 29 and 33, or a bell of the type shown in Fig. 2 may be connected in either bell loop.

In case of trouble, the system illustrated in Fig. 4 will operate similarly to the system illustrated in Fig. 2.

Referring now to Fig. 5, the source of energy 11 is shown as a generator, one terminal of which is connected to contact stud 18, and the other terminal of which is connected to junction 13. Junction 13 is connected to ground 15. Connecting piece $35^b$ is so supported upon armature 25 by means of the two insulating pieces 35 and $35^a$ that it connects contact springs 33 and 34 when armature 25 is attracted, and bears a contact lug adapted to make connections with contact stud $35^c$ when armature 25 is retracted. When armature 25 is in its retracted position contact springs 29 and 30 are adapted to engage and make contact with contact springs 33 and 34 respectively and hold them away from connecting piece $35^b$.

Under normal conditions electromagnet coils 42 and 43 are energized to hold armature 25 in its attracted position, the following closed circuit being established:—from right hand terminal of source 11 to contact stud 18, conductor 40, junction 57, conductor 59 of the first bell loop, the bells 60 in series therein, conductor 46 of the first bell loop, junction 55, conductor 44, resistance 56, conductor 30, conductor 62 of the second bell loop, the bells 60 in series therein, conductor 61 of the second bell loop, contact spring 33, connecting piece $35^b$, contact spring 34, conductor 38 of the station loop, stations 50, signaling levers 48 and 47, conductor 45 of the station loop, electromagnet coil 43, conductor $42^a$, electromagnet coil 42, conductor 41, junction 13, to left hand terminal of source 11. The winding of coils 42 and 43 is so related to that of the magnets of the bells 60 that the current passing through the circuit just described is sufficient to cause armature 25 to be moved to its attracted position, while the bell magnets are unable even to retain their armatures in attracted position. While coils 42 and 43 are themselves of comparatively high resistance, resistance 56 in series therewith assists in securing a minimum value for the normal current flow after armature 25 has been moved to attracted position.

Upon the pulling of any station and the movement of its breakwheel 49 to operate its signaling levers 47 and 48 and the consequent breaking of the normal closed circuit, armature 25 will be retracted, establishing the following four circuits; (1) from contact stud 18, contact piece 21, flexible connection $21^b$, conductor 30, resistance 56, conductor 44, junction 55, conductor 39, flexible connection $22^b$, contact piece 22, contact stud 19, conductor 16, to junction 13; (2) from contact stud 18, conductor 40, junction 57, conductor 59 of the first bell loop, the bells 60 in series therein, conductor 46 of the first bell loop, to junction 55, where this circuit joins circuit (1); (3) from contact stud 18, contact piece 21, flexible connection $21^b$, conductor 62 of the second bell loop, the bells 60 in series therein, conductor 61 of the second bell loop, contact spring 33, contact spring 29, conductor 28, to contact stud 19, where this circuit joins circuits (1) and (2); (4) from contact stud 18, conductor 40, junction 57, resistance 58, contact spring 30, contact spring 34, conductor 38 of the station loop, to signaling lever 48 of the operated station, to signaling lever 47 thereat (now open here), conductor 45 of the station loop, electromagnet coil 43, conductor $42^a$, electromagnet coil 42, conductor 41, to junction 13. The usual trouble bell and battery may be connected to connecting piece $35^b$ and contact stud $35^c$ to give an indication whenever armature 25 is retracted.

It will be seen that in circuits (2) and (3) the bell loops are now connected to the terminals of the source of energy 11 with no intervening resistance except that of the line conductors. The bell magnets are so constructed and arranged that their armatures are now effectively attracted to sound a stroke of the signal. When circuit (4) is closed by signaling levers 47 and 48, armature 25 is attracted and reëstablishes the normal closed circuit.

In case of a break in the station loop armature 25 will be retracted, causing a single stroke upon the bells 60 in both loops and continuous ringing of the trouble bell. In the case of a break in either bell loop or in the loop containing the resistance 56, the armature 25 will move toward its retracted position, closing the circuit of the trouble bell, and also closing circuit (4) from contact spring 30 to contact spring 34. As a result of this closing of circuit (4), a vibrating action will be set up resulting in a succession of strokes on the bells 60 in either or both bell loops.

In case of a ground on any part of the station loop, electromagnet coils 42 and 43 will be shunted, causing a single stroke upon the bells 60 in both bell loops and continuous ringing of the trouble bell.

In case of a ground upon the first bell loop, electromagnet coils 42 and 43 will be shunted, and armature 25 will move toward its retracted position. When the armature has moved so far that connecting piece $35^b$ is no longer in contact with contact springs 33 and 34, the following circuits are formed:—(5) from junction 57, through conductor 59 of the first bell loop, the bells 60 therein to the ground on the bell loop, ground 15, to junction 13,—and (6) from junction 57, through resistance 58, contact spring 30, contact spring 34, conductor 38 of the station loop, conductor 45 of the station loop, electromagnet coil 43, conductor $42^a$, electromagnet coil 42, conductor 41, to junction 13. The resistance of the circuit (5) will cause a sufficient flow of current through the circuit (6) including the electromagnet coils 43 and 42 to prevent the armature from being retracted far enough to close the bell circuits (2) and (3).

In case of a ground upon the second bell loop, a corresponding action takes place, circuit (5) extending from junction 57, through conductor 59 of the first bell loop, the bells 60 therein, conductor 46 of the first bell loop, junction 55, conductor 44, resistance 56, conductor 62 of the second bell loop, the bells 60 therein to the ground on the bell loop, ground 15, to junction 13.

Upon comparing Fig. 4 with Fig. 2 and Fig. 5, it will be seen that in Fig. 4 the direction of current flow in one bell loop, conductors 61 and 62, is reversed for every stroke of the signal, while in Fig. 2 and Fig. 5 the current flow in both bell loops is always in the same direction. An obvious advantage of this fixity of direction of current lies in the fact that the pointers of current indicating instruments inserted in the bell loops would all swing in the same direction on each stroke of the signal.

Referring to Fig. 6, the alternating current source of energy $11^b$ is indicated as a transformer, one terminal of the secondary winding of which is connected to contact stud 18, the other terminal being connected to contact stud 19. The direct current source of energy $11^s$ has one terminal connected to conductor 40 and the other terminal to junction 13. Junction 13 is grounded at 15. Contact pieces 21 and 22 and their associated contact ends $36^a$ and 36 are insulated from armature 25 as shown. When armature 25 is in its retracted position contact spring 30 is adapted to engage and make contact with contact spring 34 and hold it away from contact end 36. At the same time contact end $36^a$ is out of contact with contact spring 33. Trouble bell 52 is connected between contact stud 19 and contact piece 21.

Under normal conditions electromagnet coils 42 and 43 are energized to hold armature 25 in its attracted position, the following closed circuit being established:—from lower terminal of source $11^s$ to conductor 40, contact spring 33, contact end $36^a$, contact piece 21, flexible connection $21^b$, conductor 59 of the bell loop, bells 60 in series therein, conductor 46 of the bell loop, flexible connection $22^b$, contact piece 22, contact end 36, contact spring 34, conductor 38 of the station loop, signaling levers 48 and 47, station 50, conductor 45 of the station loop, electromagnet coil 42, conductor $42^a$, electromagnet coil 43, conductor 41, junction 13 to upper terminal of source $11^s$. The winding of coils 42 and 43 is so related to that of the magnets of the bells 60 that the current passing through the circuit just described is sufficient to cause armature 25 to be moved to its fully attracted position, while the bell magnets are unable even to retain their armatures in attracted position.

Upon the pulling of any station and the movement of its breakwheel 49 to operate its signaling levers 47 and 48 and the consequent breaking of the normal closed circuit, armature 25 will be retracted, establishing the following three circuits:—(1) from right hand terminal of source $11^b$, to contact stud 18, contact piece 21, flexible connection $21^b$, conductor 59 of the bell loop, the bells 60 in series therein, conductor 46 of the bell loop, flexible connection $22^b$, contact piece 22, contact stud 19, to left hand terminal of source $11^b$; (2) from contact piece 21, to flexible connection $21^b$, conductor 28, trouble bell 52, conductor 53, to contact stud 19; (3) from lower terminal of source $11^s$, to conductor 40, contact spring 30, contact spring 34, conductor 38 of the station loop to signaling lever 48 of the operated station, to signaling lever 47 thereat (now open here), conductor 45 of the station loop, electromagnet coil 42, conductor $42^a$, electromagnet coil 43, conductor 41, junction 13 to upper terminal of source $11^s$.

It will be seen that in circuit (1) the bell loop is now connected to the terminals of the alternating current source of energy $11^b$ with no intervening resistance except that of the line conductors. The bell magnates are so constructed and arranged that their armatures are now effectively attracted to sound a stroke of the signal. The closing of circuit (2) causes the ringing of the trouble bell, which continues as long as the armature 25 remains in retracted position. When circuit (3) is closed by signaling levers 47 and 48, armature 25 is attracted and reëstablishes the normal closed circuit.

In the case of a break or a ground in the station loop, armature 25 will be retracted, causing a single stroke upon the bells 60 and continuous ringing of the trouble bell 52. In the case of a break in the bell loop, the armature 25 will move toward its retracted position, closing circuit (3) from contact spring 30 to contact spring 34. As a result of this closing of circuit (3) armature 25 will be moved toward its attracted position, and a vibrating action will be set up. In the case of a ground in the bell loop, the armature 25 will move toward its retracted position, closing circuit (3) from contact spring 30 to contact spring 34, and opening circuit between contact ends 36[a] and 36 and contact springs 33 and 34. As a result of this closing and opening of circuits, armature 25 will be moved toward its attracted position, and a vibrating action, of lower frequency than in case of a break, will be set up.

Referring to Fig. 7, the source of energy 11 is represented as a direct current generator, one terminal of which is connected to junction 12, and the other terminal of which is connected to junction 13. Junction 13 is connected by conductor 51 to junction 14 and thence to ground 15. Cores 26 and 27 of electromagnet coils 42 and 43 extend through insulating piece 32. Extending back from the front edge of this insulating piece are two recesses, the contact springs 33 and 34 being mounted on piece 32 above these recesses. Contact springs 29 and 30 are so mounted on piece 32 below the recesses as to be capable of engagement with contact springs 33 and 34, respectively. Armature 25 has attached thereto the insulating piece 23. This insulating piece and insulating piece 24 support the contact studs 21 and 22. Contact stud 21 extends toward contact spring 33, being provided with an insulating piece 35 adapted to abut against contact spring 33. Contact stud 22 extends toward contact spring 34, being provided with a contact end 36 adapted to abut against contact spring 34. When armature 25 is in its fully retracted position contact studs 21 and 22 are adapted to engage with contact springs 18 and 19, respectively, mounted on the insulating piece 20. When armature 25 is in its intermediate operative position (as shown in the drawing), insulating piece 35 touches contact spring 33, which is also touching contact spring 29, and contact end 36 touches contact spring 34, which is also touching contact spring 30. When armature 25 is in its fully attracted position insulating piece 35 holds contact spring 33 away from contact spring 29, and contact end 36 holds contact spring 34 away from contact spring 30. Trouble bell 52 is arranged to be operated by trouble battery 54 when contact spring 33 touches contact spring 29.

Under normal conditions electromagnet coils 42 and 43 are energized to hold armature 25 in its fully attracted position, the following closed circuit being established:— from right hand terminal of source 11 to junction 12, conductor 40, junction 57, resistance 56, junction 55, conductor 59 of the bell loop, the bells 60 in series, conductor 46 of the bell loop, flexible connection 22[b], contact stud 22, contact end 36, contact spring 34, conductor 38 of the station loop, signaling levers 47 and 48, stations 50, conductor 45 of the station loop, electromagnet coil 43, conductor 42[a], electromagnet coil 42, conductor 41, junction 13, to left hand terminal of source 11. The winding of coils 42 and 43 is so related to that of the magnets of the bells 60 that the current passing through the circuit just described is sufficient to cause armature 25 to be moved to its fully attracted position, while the bell magnets are unable even to retain their armatures in attracted position. While coils 42 and 43 are themselves of comparatively high resistance, resistance 56 in series therewith assists in securing a minimum value for the normal current flow after armature 25 has been moved to its fully attracted position.

Upon the pulling of any station and the movement of its breakwheel 49 to operate its signaling levers 47 and 48 and the consequent breaking of the normal closed circuit, armature 25 will be retracted, establishing the following three circuits; (1) from junction 12, through conductor 17, contact spring 18, contact stud 21, flexible connection 21[b], conductor 39, to junction 55 (thus shortcircuiting resistance 56), conductor 59 of the bell loop, the bells 60 in series, conductor 46 of the bell loop, flexible connection 22[b], contact stud 22, contact spring 19, conductor 16, junction 14, conductor 51, to junction 13; (2) from junction 12, through conductor 40, junction 57, resistance 58, conductor 44, contact spring 30, contact spring 34, conductor 38 of the station loop, to signaling lever 47 of the operated station, to signaling lever 48 thereat (now open here), conductor 45 of the station loop, electromagnet coil 43, conductor 42[a], electromagnet coil 42, conductor 41, to junction 13; (3) from right hand terminal of trouble battery 54, through conductor 53, trouble bell 52, conductor 28, contact spring 29, contact spring 33, conductor 37, to left hand terminal of battery 54.

It will be seen that in circuit (1) the bell loop is now connected to the terminals of the source of energy 11 with no intervening resistance except that of the line conductors. The bell magnets are so constructed and arranged that their armatures are now effectively attracted to sound a stroke of the signal. The closing of circuit (3) causes the ringing of the trouble bell, which continues as long as the armature 25 remains out of its fully attracted position. When circuit (2) is closed by signaling levers 47 and 48, armature 25 is attracted and reëstablishes the normal closed circuit.

In case of a break in the station loop armature 25 will be fully retracted, causing a single stroke upon the bells 60 and continuous ringing of the trouble bell 52. In the case of a break in the bell loop, the armature 25 will move toward its retracted position, closing the circuit of the trouble bell 52, and also closing circuit (2) from contact spring 30 to contact spring 34. As a result of this closing of circuit (2), armature 25 will be moved toward its fully attracted position, and a vibrating action will be set up, resulting in an interrupted ringing of the trouble bell.

In case of a ground on any part of the station loop, electromagnet coils 42 and 43 will be shunted, causing a single stroke upon the bells 60 and continuous ringing of the trouble bell 52.

In case of a ground upon the bell loop, electromagnet coils 42 and 43 will be shunted, and armature 25 will move to its intermediate operative position, closing the circuit of the trouble bell 52. When in this position the following circuits are formed:—(4) from junction 57, through resistance 56, junction 55, conductor 59 of the bell loop, bells 60 to the ground on the bell loop, ground 15, junction 14, conductor 51, to junction 13; (5) from junction 57, through resistance 58, conductor 44, contact spring 30, to contact spring 34, where the circuit divides into—($5^a$) from contact spring 34, to contact end 36, contact stud 22, flexible connection $22^b$, conductor 46 of the bell loop to the ground, then joining path (4), to ground 15, junction 14, conductor 51, to junction 13,—and ($5^b$) from contact spring 34, to conductor 38 of the station loop, conductor 45 of the station loop, electromagnet coil 43, conductor $42^a$, electromagnet coil 42, conductor 41, to junction 13. The resistance of the circuit ($5^a$) will cause a sufficient flow of current through the circuit ($5^b$) including the electromagnet coils 43 and 42 to retain armature 25 in this intermediate operative position. As resistance 56 is included in circuit (4), it is evident that the ground might occur even at the first bell 60 without there being any possibility of such flow of current as might cause injury to any apparatus.

Inasmuch as many changes could be made in the above construction, and many apparently widely different embodiments of my invention could be made without departing from the scope thereof, it is intended that all matter contained in the above description or shown in the accompanying drawings shall be interpreted as illustrative, and not in a limiting sense.

It is also to be understood that the language used in the following claims is intended to cover all the generic and specific features of the invention herein described and all statements of the scope of the invention which, as a matter of language, might be said to fall therebetween.

What I claim and desire to secure by Letters Patent of the United States is:—

1. An electric signaling system comprising a bell loop, a station loop, two sources of energy, and means controlled by said station loop in one condition thereof for connecting each loop to a separate one of said sources and in another condition of said station loop for connecting both loops in series.

2. An electric signaling system comprising a bell loop, a station loop, two sources of energy, and means controlled by said station loop in one condition thereof for connecting one of said loops to one of said sources and the other loop to the other of said sources and in another condition of said station loop for connecting both loops in series.

3. An electric signaling system comprising a bell loop, a station loop, two sources of energy, and means controlled by said station loop in one condition thereof for connecting each loop to a separate one of said sources and in another condition of said station loop for connecting both loops and both sources in series.

4. An electric signaling system comprising a bell loop, a station loop, and a trouble signal loop, and means controlled by said station loop in one condition thereof for connecting two of said loops in parallel and in another condition of said station loop for connecting all of said loops in series.

5. An electric signaling system comprising a bell loop, a station loop, two sources of energy, and means controlled by said station loop in one condition thereof for connecting each loop to a separate one of said sources and in another condition of said station loop for connecting both loops in series to one at least of said sources.

6. An electric signaling system comprising two bell loops, a station loop, a source of energy, and means controlled by said station loop in one condition thereof for connecting said loops in series with each other and in another condition of said station loop for connecting said loops in parallel with each other without reversing the current through any of said loops.

7. In an electric signaling system, a bell loop, a station loop with an electromagnet therein, a source of energy, a trouble signal, and means controlled by said magnet upon deënergization thereof for first closing the circuit of said trouble signal and connecting the station loop directly to the source of energy, and thereafter connecting the bell loop directly to the source of energy.

Signed at New York, in the county of New York and State of New York, this 23rd day of April, A. D. 1917

SIMON B. HESS.